United States Patent [19]
Oertel et al.

[11] 3,857,809
[45] Dec. 31, 1974

[54] POLYURETHANE-UREAS BASED ON CIS-TRANS-1,4-DIAMINOCYCLOHEXANE

[75] Inventors: Harald Oertel, Odenthal-Gloebusch; Bruno Zorn, Cologne; Wilhelm Thoma, Bergisch-Neukirchen; Klaus Noll, Cologne, all of Germany

[73] Assignee: Bayer Aktiengesellschaft, Leverkusen

[22] Filed: Apr. 23, 1973

[21] Appl. No.: 353,279

[30] Foreign Application Priority Data
May 4, 1972 Germany............................ 2221798

[52] U.S. Cl....... 260/33.8 UB, 260/31.8, 260/326 N, 260/32.8 R, 260/33.2 R, 260/33.4 UB, 260/33.6 UB, 260/75 NH
[51] Int. Cl........................ C08g 51/28, C08g 22/04
[58] Field of Search.. 260/75 NH, 77.5 AM, 75 NK, 260/75 NE

[56] References Cited
UNITED STATES PATENTS

| | | | |
|---|---|---|---|
| 3,214,411 | 10/1965 | Saunders et al.............. | 260/75 NK |
| 3,506,617 | 4/1970 | Collardeau et al............ | 260/75 NH |
| 3,658,746 | 4/1972 | Rosendahl et al.......... | 260/77.5 AM |
| 3,734,894 | 5/1973 | Finelli et al.................... | 260/75 NH |
| 3,758,443 | 9/1973 | Koenig et al............... | 260/77.5 AM |

*Primary Examiner*—H. S. Cockeram
*Attorney, Agent, or Firm*—Gene Harsh

[57] ABSTRACT

Light stable polyurethane coatings with a considerably increased softening range and melting points coupled with improved resistance to perchlorethylene is obtained by using a chain extender comprising at least 80 mol % 1,4-diamino cyclohexane with a cis/transisomer ratio of from 10/90 to 60/40.

10 Claims, No Drawings

POLYURETHANE-UREAS BASED ON CIS-TRANS-1,4-DIAMINOCYCLOHEXANE

This invention relates to a process for the production of stable solutions of aliphatic, substantially linear segmented polyurethane-urea elastomers in weakly polar solvents of relatively high volatility, and to the production of light-stable films and coatings with high softening ranges from such solutions.

It is known that substantially linear polyurethanes can be obtained from solutions of relatively high molecular weight polyhydroxy compounds such as polyesters, aliphatic or cycloaliphatic diisocyanates such as hexamethylene diisocyanate, dicyclohexyl methane diisocyanate or 1-isocyanato-3-isocyanato methyl-3,5,5-trimethyl cyclohexane, and chain-extending agents such as ethylene diamine, 1-amino-3-amino-methyl-3,5,5-trimethyl cyclohexane or 4,4'-dicyclohexyl methane diamine. Highly polar amides such as dimethyl formamide can be used as solvents. Polyurethanes based on 1-isocyanato-3-isocyanato methyl-3,5,5-trimethyl cyclohexane and/or 1-amino-3-aminomethyl-3,5,5-trimethyl cyclohexane, in particular, are also soluble in weakly polar solvents such as toluene/isopropanol which simplifies to a very considerable extent the processing of polyurethane solutions such as these into coatings, because high-boiling, physiologically unacceptable solvents such as dimethyl formamide can be avoided.

On account of their synthesis from (cyclo) aliphatic diisocyanates and (cyclo) aliphatic diamine components, polyurethane-ureas of this kind do not discolor on exposure to light and are considerably more stable than comparable polyurethanes based on aromatic diisocyanates such as, for example, diphenylmethane-4,4'-diisocyanate. Accordingly, they are used with advantage in the production of flexible textile coatings or as surface layers on coatings. Unfortunately, their favorable solubility and light-stability properties are offset by their typically unfavorable property of a relatively low softening range and a relatively low melting point. Thus, polyurethane-ureas of this kind begin to soften at temperatures far below 200°C and, in some cases, even at temperatures below 150°C, while their melting point (Kofler bench) is generally between 180 and 210°C, even in the case of relatively "hard" polyurethanes (high NCO-content in the prepolymer, for example 5.5% by weight). In the case of coatings, the low softening range impairs fastness to rubbing under heat and resistance to hot ironing or behavior in heated presses (for example, in the case of artificial leather). In addition, coatings of this kind frequently show very high swellability in solvents of the kind used in dry cleaning, such as perchlorethylene.

It has now surprisingly been found that light-stable polyurethane coatings with a considerably increased softening range and melting points, coupled with improved resistance to perchlorethylene, can be obtained by using 1,4-diamino cyclohexane in certain stereoisomeric cis/transmixtures as chain extender which also results in the polyurethane-ureas formed having outstanding resistance to solvents.

The invention therefore relates to a process for the production of stable, light-resistant solutions of polyurethane ureas from prepolymers with terminal isocyanate groups and diamines in weakly polar solvents, distinguished by the fact that prepolymers of a. substantially linear polyhydroxyl compounds with molecular weights of from about 500 to 5000,
b. optionally low molecular weight dihydroxy compounds,
c. and aliphatic or cycloaliphatic diisocyanates, the molar ratio of hydroxyl groups to isocyanate groups being between about 1 : 1.5 and 1 : 5, are reacted with diamines as chain extenders in a solvent or mixture of solvents of aromatic which may be chlorinated and/or chlorinated aliphatic hydrocarbons and primary, secondary and/or tertiary aliphatic and/or cycloaliphatic alcohols, at least 80 mol % of the chain extender being 1,4-diamino cyclohexane with a cis/trans-isomer ratio of from 10 : 90 to 60 : 40.

The polymers prepared in accordance with the invention generally melt at temperatures in the range of from 250 to 270°C and begin to soften at temperatures of from about 215 to 240°C. The thermal properties are accordingly improved by some 50 to 60°C by using the chain extenders according to the invention. In addition, the polyurethanes according to the invention are also extremely fast to light and can be prepared in a highly hydrolysis-stable composition by using dihydroxy polycarbonates based on hexane diol as the relatively high molecular weight polyhydroxyl compounds. It is possible, by the incorporation of low molecular weight diols containing tertiary amine groups, to obtain a further improvement in light stability beyond the already existing stability level.

Although the use of pure trans-1,4-diamino cyclohexane as chain extender also leads to products of very high melting point, it does involve the disadvantage that the polyurethanes synthesized in this way do not remain stably dissolved in many of the solvent mixtures according to the invention and rapidly change from their solutions into a paste-like, gelled form in which they are no longer suitable for processing into coatings. With pure cis-1,4-diamino cyclohexane the melting point of the polyurethane coatings falls again and approaches the behavior of known polyurethanes based on conventional diamine extenders as described above. A lower softening range is also found with 1,3-diamino cyclohexane.

By using a certain cis/trans-mixture of the stereoisomeric 1,4-diamino cyclohexanes in accordance with the invention, it is possible to obtain both a considerably improved softening range and melting range of the polyurethanes and also an adequate level of solubility of these polyurethanes in the moderately polar solvent mixtures of comparatively high volatility that are preferably used.

At the same time, a distinct improvement in light stability is obtained, by comparison with the products obtainable with conventional chain extending agents.

The cis-enriched diamino cyclohexanes are liquid and can readily be separated from the isomer mixture; the trans-compound of the 1,4-diamino cyclohexane is crystalline and can be readily recrystallized, for example from petroleum ether, and obtained in pure form. The cis/transratio can be determined by nuclear resonance spectroscopy (220 mc/s apparatus) at 2.836 ppm and 2.597 ppm.

The preferred cis/trans-ratios of the 1,4-diamino cyclohexane are from 50:50 to 15:85, the most favorable range being from about 40:60 to 20:80.

The substantially linear polyurethane ureas are prepared by methods known per se. Substantially linear polyhydroxyl compounds such as dihydroxy polyesters, polycarbonates and polyacetones with molecular weights of from about 500 to 5000 (preferably from 800 to 3000) and melting points below 60°C (preferably below 45°C) are reacted with the aliphatic and/or cycloaliphatic diisocyanates in an NCO : OH molar ratio of from about 1.5 : 1 to about 5 : 1, preferably from 2 : 1 to 3 : 1, to form the NCO prepolymer. (If the molar ratio is greater than 2 : 1, the reacted mixture contains fractions of the monomeric diisocyanate in addition to the NCO prepolymer. In the following, the term "prepolymer" is also intended to cover mixtures of this kind).

Examples of polyesters suitable for the process according to the invention include adipic acid-ethylene glycol, -1,6-hexane diol, -2,2-dimethyl propane diol, -1,4-butane diol or -1,2-propane diol polyesters or mixtures of these components. The adipic acid in the polyesters may also to some extent be replaced, for example, by phthalic acid or isophthalic acid. Polycaprolactone ester types which contain the hydroxy caproic acid unit as a structural component, are particularly suitable because of their resistance to hydrolysis. Dihydroxy polycarbonates based on 1,6-hexane diol or mixed polycarbonates into which adipic acid, for example, is incorporated in small quantities instead of carbonic acid, for example in quantities of about 20 mol %, are even more suitable because of their outstanding resistance to hydrolysis. Mixtures of the aforementioned compounds can also be used.

In addition to the relatively high molecular weight polyhydroxy compounds, low molecular weight diols with molecular weights of from 62 to about 400, for example ethylene glycol, 1,4-butane diol, 2,3-butane diol; 2,2-dimethyl-1,3-propane diol or N-stearyl-N',N'-bis-oxethyl urea, can also be used in relatively small quantities (about 0.05 to 1 mol per kg of elastomer) in the preparation of the prepolymer. Diols containing tertiary amino groups, for example N,N-bis-(β-hydroxy ethyl)-methylamine, N,N-bis-(β-hydroxy ethyl)-isopropyl amine, N,N-bis-(β-hydroxy propyl)-tert.-amylamine and bis-(3-aminopropyl)-piperazine, are particularly preferred because, in this way, a considerable further improvement in stability against loss of strength under the effect of light is obtained in the already light-stable non-discoloring polyurethanes. Other diol compounds containing tertiary amino groups suitable for use in the process according to the invention are described in German Offenlegungsschrifts Nos. 1,495,830 and 2,058,502.

The preferred isocyanate component is 1-isocyanato-3-isocyanato methyl-3,5,5-trimethyl cyclohexane, which may be mixed with smaller quantities (of up to about 25 mol %) of other aliphatic or cylcoaliphatic diisocyanates, for example hexamethylene-1,6-diisocyanate; 2,2,4-trimethyl hexane-1,6-diisocyanate; 4,8-dioxa-6,6-dimethyl undecane-1,11-diisocyanate; lysine-$C_1$–$C_6$-alkyl ester diisocyanates; 1,4-dicyclohexane diisocyanate and, in particular, 4,4'-dicyclohexyl methane diisocyanate or 3,3'-dimethyl-4,4'-dicyclohexyl methane diisocyanate (preferably in the form of the cis/cis- or cis/trans-enriched stereoisomer mixtures).

1,4-diamino cyclohexane with cis/trans-isomer ratio according to the invention can be used on its own as a chain extender, although it is also possible to use other, preferably amino functional compounds known per se, although their content should preferably not amount to any more than 20 mol % of the chain extenders, so that the melting point of the polyurethanes is not excessively reduced. Other chain extenders are preferably added in quantities of up to about 12 mol %, for example ethylene diamine, 1,2-propylene diamine, hexamethylene diamine, N-methyl-bis (3-amino propyl)-amine, bis-N,N'-(3-amino propyl)-piperazine, 1,3-cyclohexane diamine, 4,4'-dicyclohexyl methane diamine, 3,3'-dimethyl-4,4'-diamino dicyclohexyl methane and 1-amino-3-aminomethyl-3,5,5-trimethyl cyclohexane. Preferred co-extenders include ethylene diamine, dicyclohexyl methane diamine and 1-amino-3-aminomethyl-3,5,5-trimethyl cyclohexane.

It is also usually possible to use small quantities of monoamines or amino alcohols for chain termination of the polyaddition reaction and small quantities of triamines to increase viscosity.

In the process according to the invention, the diamines are reacted with the NCO-prepolymers in preferably equivalent or slightly excess quantities (for example in $NH_2$: NCO molar ratios of 1 : 1 to 1.15 : 1). Due to the avoidance of an excess of NCO, solutions of this kind are highly stable on storage. The free amino groups can also be reacted with diisocyanates and polyisocyanates in, at most, equivalent quantities (accompanied by an increase in viscosity) or with monoisocyanates (to remove terminal amino groups).

The polyurethanes which can be obtained by the process according to the invention contain typical ("hard segments" (of diisocyanate and diamines) with the structure:

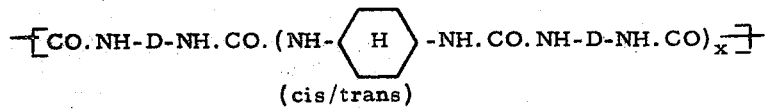

(cis/trans)

in which the groups D are predominantly radicals of the formula

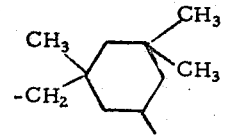

and x is an integer of from 1 to 5. In addition, D can also be a radical of a (cyclo)aliphatic diisocyanate, for example the hexamethylene radical or the dicyclohexylmethane radical

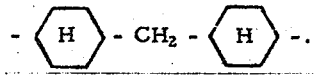

Structures containing the radical

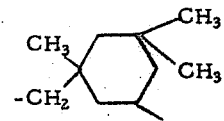

either exclusively or in a proportion of at least 75%, are preferred. If the proportion of other (cyclo) aliphatic diisocyanates is increased appreciably further (for example 50% of dicyclohexyl methane), the polyurethane ureas become insoluble in the solvents used in the process according to the invention. The 1,4-diamino cyclohexane radical

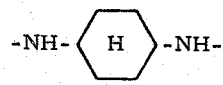

is present in cis/trans stereoisomeric proportions of from 10/90 to 60/40, preferably from 15/85 to 50/50. These radicals can be replaced by other (cyclo)-aliphatic diamines as chain extenders in quantities of up to about 20 mol %, preferably in quantities of up to 12 mol %.

The hard segments are generally attached through urethane groups to the so-called "soft-segments" which preferably consist of a linear dihydroxy-polyester, -polycaprolactone or -polycarbonate. In principle, a soft segment may also be a polyether radical, although the light stability of polyurethanes such as there is low in the absence of specific stabilization.

In addition to the hard segment structures, the incorporation of low molecular weight dihydroxy compounds into the prepolymer also gives rise to the formation of structural segments such as

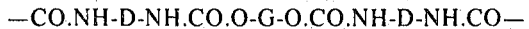

which are attached to the relatively high molecular weight dihydroxy compounds through urethane groups and/or to the hard segments through urea groups. G is the radical of the low molecular weight dihydroxy compound, for example an alkylene or cycloalkylene radical with up to 13 carbon atoms and, preferably, an N-alkyl-(alkylene)$_2$-radical in which the primary, secondary or tertiary alkyl group contains from 1 to 12 carbon atoms and the alkylene groups contain from 4 to 10 carbon atoms.

Solvent mixtures of aromatic or aliphatic hydrocarbons which may be chlorinated with primary, secondary and/or tertiary aliphatic and/or cycloaliphatic alcohols, are particularly suitable for use as solvents for the substantially linear, aliphatic polyurethane ureas with the aforementioned structures and for the process according to the invention. The solutions have solids contents of from about 5 to 40% by weight, preferably from 15 to 35% by weight. Examples of the hydrocarbons used in the process according to the invention include toluene, xylene, ethyl benzene, mesitylene, chlorotoluenes and hydrocarbon cuts of petroleum or synthesis fractions predominantly containing aromatic hydrocarbons (for example Esso's Solvesso-100 of b.p. 156–178°C., flashpoint 45°C). Compounds such as trichloroethylene or perchlorethylene are used as the chlorinated aliphatic hydrocarbons while preferred alcohols include C$_2$–C$_8$ alcohols such as ethanol, propanol, isopropanol, butanol, isobutanol, primary, secondary, or tertiary amyl alcohols, primary, secondary or tertiary hexyl alcohols, tert.-butanol or ter.-octyl alcohol, and also diacetone alcohol. Mixtures of toluene or xylene with isopropanol, isobutanol or tert.-butanol are particularly effective solvents. The solvent mixtures (in hydrocarbon : alcohol quantitative ratios of 1 : 10 to 10 : 1, preferably from 1 : 3 to 3 : 1) have better dissolving properties than the individual components. Relatively high boiling solvent mixtures such as Solvesso/ethylene glycol monomethyl ether or Solvesso/ethylene glycol monoethyl ether have the advantage of giving the solution a higher flashpoint although, on the other hand, they are more difficult to remove again than the readily volatile solvents during the further processing of the polymer solutions.

Other solvents may be added as diluents to the solutions before processing, for example before spraying of the solutions, in order to obtain the low viscosity required. On the other hand, any required film-forming rate can be adjusted by additions of high-boiling solvents. Examples of such solvents include methylene chloride, tetrahydrofuran, dioxan, ethyl acetate, methyl ethyl ketone, amyl acetate or, as high-boiling solvents, ethylene glycol monomethyl ether acetate or even dimethyl formamide in small quantities.

Such additives as stabilizers, anti-agers, hydrolysis stabilizers, UV-absorbers, soluble dyes, pigments of organic or inorganic structure, fillers, carbon black or white pigments can be added in the usual form and quantities of the polyurethane solutions as known per se for modification purposes. Whiteners or other soluble high molecular weight substances, such as nitrocellulose, cellulose esters and ethers and other derivatives, also soluble polymers or polycondensates, can also be added.

Application of the polyurethane urea solution mixtures for layer formation to substrates or intermediate supports is carried out by any process known per se, for example by casting, doctor-coating spread-coating, brush-coating, spray-coating or printing. Textile coatings on, for example, webs, woven fabrics or knitted fabrics can be applied in relatively thick layers in the case of relatively soft polyurethane settings (softness controlled by the NCO-content of the prepolymer used for preparation; for example 2.5 to 4.5% by weight of NCO) in any constructions and aftertreatment stages (for example roughened surfaces). The solution mixtures can also be applied to intermediate supports, for example release papers, steel bands or siliconized fabrics, in which case the films formed can be further processed by bonding or by the reversal process.

In one preferred procedure, roughened cotton fabric weighing approximately 220 to 240 g/cm$^2$ is coated with the polyurethane solution by the reversal process on a coating machine by means of doctor rolls. To this end, a surface layer is applied with the solution to the release paper and dried in a first operation through the drying ducts of the coating machine at temperatures rising from 80 to 120°C. The coating is applied in a quantity of from about 40 to 50 g/cm$^2$ of solid substance. In a second operation, the elastomer solutions are diluted with approximately 5 to 10% of dimethyl formamide or cyclohexanone and are applied as an adhesive coat to the dry surface layer, the fabric is laminated on and the web dried again in the drying duct. The release paper and the laminated fabric are separately wound up after leaving the drying duct. The total application of polyurethane to the fabric amounts to between about 60 and 90 g/cm$^2$. Approximately 10 to 20% of pigments can be incorporated in the solutions in order to provide them with any required color.

Harder polyurethane settings (NCO-contents of from about 4 to 7% by weight in the prepolymer) are preferably applied as surface coats or as finished to textile coatings, leather or artificial leather, for example by doctor-coating, spray-coating or printing, and the solvent is removed by brief heating, for example by heating for 3 minutes at 170°C.

The invention is further illustrated but is not intended to be limited by the following examples in which all parts and percentages are by weight unless otherwise specified.

EXAMPLE 1

NCO-prepolymer formation 1200 parts of a 1,6-hexane diol polycarbonate with an OH number of 58.25 (molecular weight 1925) are stirred with 25.7 parts of N,N-bis-($\beta$-hydroxy propyl)-methyl amine, a solution of 405.8 parts of 1-isocyanato-3-isocyanato methyl-3,5,5-trimethyl cyclohexane in 408 parts of Solvesso-100 (aromatic solvent cut with a flashpoint above 45°C, an Esso product) is added at 65°C and the 80% solution is subsequently heated for 2 hours to 95°C for prepolymer formation. The prepolymer has an NCO content of 5.28% (calculated on solid substance).

a. Chain extension with 1,4-diamino cyclohexane (36% cis/64% trans-ratios)

9.25 parts of 1,4-diamino cyclohexane are dissolved in 371 parts of an ethylene glycol monoethyl ether/Solvesso-100 mixture (1 : 1 parts by weight) and 155.5 parts of prepolymer solution introduced in the form of a thin stream with vigorous stirring (102 equivalents of $NH_2$ to 100 equivalents of NCO). The homogeneous highly viscous 25% solution formed has a solution viscosity of 1050 poises/20°C. The properties of films cast from this solution (doctor-coating on to glass plates, followed by evaporation of the solvent at about 70 to 100°C) are shown in Table I.

The solution shows outstanding levelling behavior, even after standing for several weeks.

A finish prepared from the solution on sheets of artificial leather is surprisingly resistant to aqueous-alcohol mixtures, in contrast to polyurethanes which have been chain extended for example with ethylene diamine or 1-amino-3-aminomethyl-3,5,5-trimethyl cyclohexane (see comparison tests). However, the substance is readily soluble in the solvent mixture used for production and in mixtures of toluene and isopropanol.

In order to test the properties of the finish, 100 parts of the 25% PUR-solution (dissolved in a mixture of Solvesso-100 and ethylene glycol in a ratio of 1 : 1) are diluted with 50 parts of a solvent mixture of 50% of ethylene glycol, 25% of toluene and 25% of isopropanol and applied with a doctor knife in a layer thickness of 12 $\mu$ to a knitted fabric which has been coated with polyurethane by the reversal process. After drying for 1 minute at 140°C and cooling, the finished material is dry, has a very fine gloss coupled with a pleasant feel and shows favorable fastness to rubbing and flexing:

300 rub-strokes under a load of 1 kp with a VESLIC apparatus (according to Schweize Farbechtheit-sprufungsblatt C 4500);

over 100,000 flexings according to DIN 53 340.

The finish is resistant to rubbing with 50% alcohol, it shows very moderate resistance to 98% alcohol. Its fastness to light, as measured on the 8-stage international blue scale, is greater than 7. After storage for 4 weeks at 70°C/98% relative humidity, a film prepared from the polyurethane solution still has 94% of its original ultimate tensile strength which is outstanding for polyester polyurethanes. 100 parts of the lacquer of Example 1a, but prepared in a mixture of tert.-butanol and xylene (1 : 1), are dissolved in 300 parts of a mixture of equal parts of ethyl glycol, dimethyl formamide and toluene and colored with a standard light-brown nitrocellulose pigment (Bayer's Egaloncaramel). This solution is sprayed on to the embossed surface of an artificial leather (5 to 6 g of dry substance per m²). The artificial leather consists of a latex-bonded polyamide fiber web with a surface layer of coagulated polyurethane (approximately 0.3 mm thick). After spraying and drying of the finish, the unpleasant rubber-like feel has completely disappeared. The surface shows a fine gloss, coupled with high resistance to flexing, scratching and rubbing. The resistance of the finish to aliphatic hydrocarbons is extremely good and its resistance to concentrated alcohol is moderate.

b. Comparison test

Chain extension with trans-1,4-diaminocyclohexane

The trans-1,4-diamino cyclohexane is obtained by treating the semi-solid cis/trans-mixture of (a) with petroleum ether, filtering off the solid fraction under suction and recrystallizing the solid isomer from petrol with a melting point of 65 to 67°C and a trans-isomer content of 97%.

9.25 parts of the trans-isomer of 1,4-diamino cyclohexane are reacted with 155.5 parts of the prepolymer solution of 1(a) (102 equivalents of $NH_2$ to 100 equivalents of NCO). A homogeneous, highly viscous 25% solution is obtained, becoming steadily more viscous in a matter of minutes so that it is diluted with 132 parts of a Solvesso/ethylene glycol mixture to a solids content of 20%. The solution then has a viscosity of around 1500 poises and changes into a totally gelled form (crumbly without any flow properties) over another 30 minutes at room temperature. A coating is applied from the paste, the solvent evaporated off and the $v_i$-value measured in hexamethyl phosphoramide. The $v_i$-value of 0.85 corresponds to a conventional high-polymeric linear polyurethane elastomer. Accordingly, gelling is by no means attributable to crosslinking, but merely to an increase in viscosity. The substance has an extremely high softening point and melting point (see Table 1), but in this composition is neither solvatable nor soluble in the aforementioned solvents, but only in highly polar solvents such as dimethyl formamide.

c. Comparison test

Chain extension with cis-enriched 1,4-diamino cyclohexane (75% cis/25% trans)

The sample is obtained by decanting off the liquid fractions from the stereoisomer mixture of diamino cyclohexane which is semi-solid at room temperature and, according to NMR-analyzing, contains 74.8% of cis- and 25.2% of trans-isomers.

9.25 parts of the cis-enriched 1,4-diamino cyclohexane are reacted with 155.5 parts of the prepolymer solution of 1 (a) to form a homogeneous, highly viscous 25% solution and diluted to a solids content of 20.4%. After 1 day, this solution has lost its homogeneity and flow properties and, after 2 days, has changed into a paste-like form. Some of the solution was diluted to 15% immediately after preparation and cast into films (see Table 1). The softening point is distinctly lower than in test 1 a.

d. Chain extension with a mixture of cis-enriched and trans-1,4-diamino cyclohexane Equal parts of the trans-isomer used in 1 (b) (97% trans/3% cis) and the cis-mixture used in 1 (c) (74.8% cis/25.2% trans) are used for chain extension, giving a mixture with a trans-isomer content of 61.6% and a cis-isomer content of 38.4%.

9.25 parts of the (38.4% cis/61.6% trans)-1,4-diamino cyclohexane are reacted as in 1 (a) with 155.5 parts of prepolymer solution, resulting in the formation of a homogeneous, highly viscous and stable elastomer solution. Following dilution of part of the solution, films are prepared and their properties determined (see Table 1). The technical properties correspond to those of Example 1a.

e. Comparison test

Chain extension with ethylene diamine 3.25 parts of ethylene diamine in 230 parts of Solvesso/ethyl glycol (1 : 1) are mixed with stirring with 107.5 parts of the NCO-prepolymer solution (equivalent quantity), resulting in the formation of a clear homogeneous solution with a viscosity of 286 poises at 20°C ($c$ = 26.6%). The solution remains stable over several weeks. Films cast from the solution show the properties set out in Table 1.

The low melting and softening points of these elastomers are remarkable.

On exposure to light, the films are far less stable to dehydration than films prepared according to Example 1a although neither of the two films discolors under Xenotest or Fadeometer test conditions.

The coatings soften very considerably when treated with alcohol or water/alcohol (1 : 1) and are seriously damaged by even gentle rubbing. This behavior is also shown by coatings of polyurethanes prepared with 1-amino-3-aminomethyl-3,5,5-trimethyl cyclohexane instead of ethylene diamine.

69.3 parts of 1,4-diamino cyclohexane (17.3% cis/82.7% trans) are dissolved in 2411 parts of toluene/isopropanol (1 : 1) and 1200 g of the above NCO prepolymer solution (the equivalent quantity) stirred in. The homogeneous solution has a viscosity of 680 poises. After an observation period of 1 month, the solution was still free-flowing. The film properties are shown in Table 2. The technical properties as a finish correspond to the values given in Example 1a. If toluene is replaced by chlorobenzene, homogeneous storage-stable elastomer solutions are also obtained, from which finishes with the properties and characteristics given in Example 1 a can be prepared.

b. Co-extension with 1,4-diamino cyclohexane/ethylene diamine (90 : 10)

5.18 parts of the 1,4-diamino cyclohexane used in 2 a and 0.31 parts of 98% ethylene diamine are dissolved in 235 parts of toluene/isopropanol (1 : 1) and stirred with a substantially equivalent quantity of the NCO-prepolymer to form a homogeneous solution with a viscosity of 270 poises at 20°C and a solids content of 25%. The solution remains stable over the observation period of 1 month; the properties of the films are set out in Table 2. The high melting point of 2a remains substantially unaltered.

c. Co-extension with 1,4-diamino cyclohexane/ethylene diamine (80 : 20)

In the event of similar extension with 20 mol % of ethylene diamine as co-extender (4.62 parts of diamino cyclohexane/0.62 parts of ethylene diamine), a homogeneous storage-stable solution with a viscosity of 270 poises/20°C and a solids content of 25% is also obtained.

Table 1

Solution and film properties of polyurethane ureas according to Example 1

| Example | 1,4-diaminocyclohexane cis/trans content (%) | solution viscosity poises/20°C | Solution concentration (% by weight) | $\eta$ i-value |
|---|---|---|---|---|
| 1 a) | 36/64% | 1050 | 25 | 0.76 |
| 1 b) | 3/97% (comparison test) | 1500 | 20 (very quickly gelled) | 0.85 |
| 1 c) | 75/25 (comparison test) | 2000 | 20.4 | 0.88 |
| 1 d) | 38.4/61.6 | 2500 | 20.5 | 0.96 |
| 1 e) | ethylene diamine (comparison test) | 286 | 26.2 | — |

| Example | Ultimate tensile strength g/dtex | Breaking elongation (%) | Heat distortion temperature HDT: (cf. DOS 1770591) | Melting behavior Kofler bench softening °C | melting point °C | Remarks |
|---|---|---|---|---|---|---|
| 1 a) | 0.74 | 447 | 143.5 | >235°C | >260°C almost liquid | Solution stable |
| 1 b) | cannot be measured | no film | — | approx. 260°C | (>260°C) | solution unstable, turning immediately into a paste |
| 1 c) | 0.84 | 471 | 124 | >215–220 | >239 | solution unstable, turning into a paste after standing for 1 day |
| 1 d) | 0.80 | 481 | 154 | >230–245 | >260 liquid | solution stable |
| 1 e) | 0.83 | 442 | 103 | 175–193 | >205 liquid | film damaged when rubbed with ethanol |

EXAMPLE 2

A prepolymer solution is prepared in accordance with Example 1, the only difference being that toluene is used as the solvent, instead of Solvesso-100. The prepolymer solution obtained has an NCO-content of 5.32%, based on solids. The chain-extending reactions are carried out in toluene/isopropanol (ratio by weight 1 : 1).

a. Chain extension with 1,4-diamino cyclohexane (82.7% trans/17.3% cis)

d. Co-extension of 1,4-diamino cyclohexane with 1-amino-3-aminomethyl-3,5,5-trimethyl cyclohexane (90/10)

If 10 mol % of 1-amino-3-aminomethyl-3,5,5-trimethyl cyclohexane are used instead of the ethylene diamine (5.18 parts of 1,4-diamino cyclohexane according to 2a/0.86 parts of 1-amino-3-aminomethyl-3,5,5-trimethyl cyclohexane), with the procedure otherwise the same as in Example 2b, a storage-stable homogeneous elastomer solution with a viscosity of 380 poises/20°C, c = 25%, is obtained. The properties of the films are given in Table 2.

e. Co-extension of 1,4-diamino cyclohexane with 1,3-diamino cyclohexane (90/10)

5.18 parts of 1,4-diamino cyclohexane and 0.58 parts of 1,3-diamino cyclohexane are similarly reacted to form a homogeneous, storage-stable solution (viscosity = 220 poises at 20°C). The properties of the films are given in Table 2.

Films of this solution show a melting point of 260°C, softening beforehand at temperatures upwards of about 225 to 235°C. Softening is somewhat more pronounced than in Example 1 because the urethane has a "softer" structure (less NCO, i.e. less hard segment). $\nu_i$-value = 0.70 (see Table 3).

Chain extension can also be carried out in toluene/isopropanol and xylene/tert.-butanol mixtures (3 : 1 to 1 : 3), stable solutions again being obtained.

Table 2

Solution and film properties of the polyurethane ureas according to Example 2

| Example | 1,4-diamino cyclohexane cis/trans content 17.3/82.7% | solution viscosity poises/20°C | solution concentration | $\eta$ i-value |
|---|---|---|---|---|
| 2 a) | 100% | 680 | 28 | 0.85 |
| 2 b) | 90% 1,4-diamino cyclohexane 10% ethylene diamine | 270 | 25 | — |
| 2 c) | 80% 1,4-diamino cyclohexane 20% ethylene diamine | 270 | 25 | 0.84 |
| 2 d) | 90% 1,4-diamino cyclohexane 10% 1-amino-3-aminomethyl-3,5,5-trimethyl cyclohexane | 380 | 25 | 0.85 |
| 2 e) | 90% 1,4-diamino cyclohexane 10% 1,3-diamino cyclohexane | 220 | 25 | 0.82 |

| Example | Ultimate tensile strength g/dtex | Breaking elongation (%) | HDT determined in accordance with DOS 1770591 (°C) | melting behavior Kofler bench softening | melting point (liquid) °C |
|---|---|---|---|---|---|
| 2 a) | 0.76 | 434 | 157 | >240 | >265 |
| 2 b) | 0.73 | 425 | 147 | >235 | >255 |
| 2 c) | 0.76 | 400 | 144 | >225 | >250 |
| 2 d) | 0.80 | 443 | 153 | >(220-)240 | >260 |
| 2 e) | 0.79 | 407 | 152 | >(215-)240 | >264 |

EXAMPLE 3

600 parts of the hexane diol polycarbonate of Example 1 are heated for some 220 minutes to 97°C with 138.5 parts of 1-isocyanato-3-isocyanato methyl-3,5,5-trimethyl cyclohexane and 185.5 parts of Solvesso-100, resulting in the formation of a prepolymer solution with an NCO-content of 3.58% (based on the solid substance).

a. Chain extension with 1,4-diamino cyclohexane (17.3% cis/82.7% trans)

4.2 parts of diamino cyclohexane are introduced into 233 parts of Solvesso/ethylene glycol (1 : 1) and 107.5 parts of the prepolymer solution introduced with stirring. A homogeneous, storage-stable solution with a viscosity of 266 poises/20°C is obtained.

b. Comparison test

Chain extension with ethylene diamine and with 1-amino-3-aminomethyl-3,5,5-trimethyl cyclohexane Elastomer solutions are prepared and cast into films in the same way as in test 3a, but with 2.25 parts of 95% ethylene diamine ($\alpha$) and 6.25 parts of 1-amino-3-aminomethyl-3,5,5-trimethyl cyclohexane ($\beta$).

These polyurethane films have a much lower melting point: with ethylene diamine, 203°C, softening considerably before melting at above 152°C, with 1-amino-3-aminomethyl-3,5,5-trimethyl cyclohexane 214°C, softening before melting at above 178°C. In addition, a distinct reduction in strength on exposure to light is also observed (see Table 3).

Table 3

| Example No. | Exposure Time | Ultimate tensile strength g/dtex | Breaking elongation % | Modulus 300% mg/dtex |
|---|---|---|---|---|
| 3 a) | original | 0.69 | 487 | 219 |
|  | 66 hours | 0.57 | 445 | 210 |
|  | 110 hours | 0.50 | 474 | 188 |
|  | 154 hours | 0.25 | 360 | 163 |
| 3 b/$\alpha$ (ethylene diamine) | original | 0.64 | 450 | 168 |
|  | 66 hours | 0.22 | 452 | 87 |
|  | 110 hours | 0.17 | 422 | 79 |
|  | 154 hours | cannot be measured | — | — |
| 3 b/$\beta$ (1-amino-3-aminomethyl-3,5,5-trimethyl cyclohexane) | original | 0.66 | 450 | 254 |
|  | 66 hours | 0.57 | 457 | 223 |
|  | 110 hours | 0.29 | 382 | 182 |
|  | 154 hours | 0.15 | 327 | 112 |

EXAMPLE 4

1500 parts of an adipic acid/1,6-hexane diol/2,2-dimethyl-1,3-propane diol mixed polyester with a molecular weight of 1670 (molar ratio of the glycols 65 : 35) are heated for 4 hours to 100 – 110°C with 30.1 parts of N,N-bis-($\beta$-hydroxy propyl)-methyl amine, 425.6 parts of 1-isocyanato-3-isocyanato methyl-3,5,5-trimethyl cyclohexane and 485 parts of toluene. Thereafter the prepolymer solution has an NCO-content of 3.34% NCO (based on solids).

38.9 parts of 1,4-diamino cyclohexane (17.3% cis/82.7% trans) are dissolved in 1961 parts of toluene/isopropanol (1 : 1) and the resulting solution intensively stirred with 1073 parts of prepolymer solution. After dilution of the highly viscous solution to 25%, the homogeneous elastomer solution has a viscosity of 390 poises/20°C.

The films show favorable mechanical properties, a melting point of 260°C and a softening range of from about 222 to 235°C.

After the solution has been cast to form a reversal film, the following properties were measured on the clear, tack-free film: shore hardness 86, ultimate tensile strength 600 kg/cm$^2$, breaking elongation 580%; ultimate tensile strength after 66 hours Fade-o-meter testing 290 kg/cm$^2$, elongation 670%; after 400 hours Fade-o-meter testing 250 kg/cm$^2$, 660% elongation. After hydrolysis for 7 days at 70°C/95% relative humidity, the films have a residual strength of 540 kg/cm$^2$ at 470% elongation which, after 14 days falls to 410 kg/cm$^2$ at 620% elongation.

EXAMPLE 5

800 parts of a hexane diol polycarbonate of molecular weight 1925, 15.78 parts of N,N-bis-($\beta$-hydroxy propyl)-methyl amine, 208.8 parts of 1-isocyanato-3-isocyanato methyl-3,5,5-trimethyl cyclohexane and 257 parts of toluene, are heated to 110 – 115°C until the NCO content of the prepolymer solution has fallen to 3.365% NCO (based on solid substance). 36.6 parts of 1,4-diamino cyclohexane (30% cis/70% trans) are mixed with 1958 parts of toluene/isopropanol (1 : 1) and 1000 parts of the above NCO-prepolymer solution, resulting in the formation of a homogeneous, storage-stable clear elastomer solution. The film begins to soften fairly considerably at around 220°C and becomes liquid above 260°C. The film properties are shown in Table 4.

Testing of the mechanical properties of films which can be further processed by the reversal process gives the following data (accompanied for comparison by the data of a comparison substance of similar composition extended with 1-amino-3-amino methyl-3,5,5-trimethyl cyclohexane):

|  | Example 5 | Comparison test |
|---|---|---|
| micro hardness | 82 | 84 |
| ultimate tensile strength kg/cm$^2$ | 570 | 480 |
| breaking elongation % | 370 | 340 |
| 7 days' hydrolysis at 70°C/95 % relative humidity (strength/elongation) | 525/390 | 450/420 |
| 14 days' hydrolysis under the same conditions (strength/elongation) | 510/380 | 440/380 |
| 400 hours' Xeno-testing | 470/410 | 315/380 |
| swelling in perchlorethylene | 26% | 90% |

The solutions of Example 5 give high-strength, hydrolysis-resistant and light stable polyurethane coatings which show extremely low swelling and, hence, high dry-cleaning resistance.

EXAMPLE 6

720 parts of the hexane diol polycarbonate used in Example 1 and 80 parts of an adipic acid-1,6-hexane diol/2,2-dimethyl-1,3-propane diol polyester with the same composition as in Example 4, are heated for 160 minutes to between 95 and 98°C with 194.5 parts of 1-isocyanato-3-isocyanato methyl-3,5,5-trimethyl cyclohexane and 57 parts of dicyclohexyl methane-4,4'-diisocyanate (molar ratio of the diisocyanate 80 : 20) in 265 parts of toluene, resulting in the formation of an NCO-prepolymer with an NCO content of 5.44% (based on the solids content).

13.45 parts of 1,4-diamino cyclohexane (36/64 cis/trans-mixture) and 4.48 parts of dicyclohexyl methane-4,4'-diamine (97.7%) [molar ratio of the diamines 85 : 15] are dissolved in 604 parts of toluene/isopropanol (1/1), and 259 parts of the above NCO prepolymer solution added, resulting in the formation of a highly viscous elastomer solution (860 poises) which, after dilution to 21%, has a viscosity of 95 poises and can be dried to form clear films.

The films have a melting point of 265°C and a softening point of from 235 to 240°C. Highly flexible finishes resistant to flexing and unaffected by hydrolysis are obtained from the solution.

If the above NCO-prepolymer solution is chain-extended with corresponding quantities of ethylene diamine or 1-amino-3-amino methyl-3,5,5-trimethyl cyclohexane, much lower-melting films are obtained.

If it is attempted to synthesize an NCO-prepolymer solution from a mixture of 50/50 mol % of 1-isocyanato-3-isocyanato methyl-3,5,5-trimethyl cyclohexane/dicyclohexyl methane diisocyanate, and if the solution in toluene/isopropanol is chain-extended as above with 1,4-diamino cyclohexane, an unstable solution is obtained which very quickly turns into a paste and can no longer be spread.

TABLE 4

Solution and film properties of the polyurethane ureas according to Examples 3 to 6
("softer" coating type — approximately 3.5% of NCO in the prepolymer)

| Example | 1,4-diamino cyclohexane cis/trans content | solution viscosity poises/20°C | solution concentration | $\eta_r$-value |
|---|---|---|---|---|
| 3 a) | 17.3 / 82.7 | 266 | 26.2 | 0.70 |
| 3 b) | comparison tests | | | |
|  | with ethylene diamine | 90 | 26.2 | — |
|  | 1-amino-3-amino methyl-3,5,5-trimethyl cyclohexane | 165 | 26.2 | — |

TABLE 4 — Continued

Solution and film properties of the polyurethane ureas according to Examples 3 to 6
("softer" coating type — approximately 3.5% of NCO in the prepolymer)

| Example | 1,4-diamino cyclohexane cis/trans content | solution viscosity poises/20°C | solution concentration | $\eta_r$-value |
|---|---|---|---|---|
| 4 | 36/64 | 390 | 25 | — |
| 5 | 30/70 | 260 | 28 | 0.81 |
| 6 | 36/64 | 860 | 25 | — |

| Example | Ultimate tensile g/dtex | Breaking elongation % | HDT determined in accordance with DOS 1,770,591 °C | melting behavior Kofler bench softening °C | melting behavior Kofler bench melting point (liquid) °C | solvent |
|---|---|---|---|---|---|---|
| 3 a) | 0.69 | 487 | 150 | >(225–)235 | 260 | Solvesso-100/ethylene glycol (1 : 1) |
| 3 b) | 0.64 | 450 | 69 | from 152 | 203 | Solvesso-100/ethylene glycol (1 : 1) |
|  | 0.66 | 450 | 106 | from 178 | 214 | Solvesso-100/ethylene glycol (1 : 1) |
| 4 | 0.74 | 525 | 118 | >222–235 | 260 | toluene/isopropanol |
| 5 | 0.82 | 436 | 117 | >220 | 260 | toluene/isopropanol |
| 6 | 0.68 | 464 | 154 | >240 | >260 | toluene/isopropanol (prepolymer: 5.44% NCO finish type) |

EXAMPLE 7

NCO-prepolymer formation 1300 parts of the hexane diol polycarbonate described in Example 1 and 145 parts of the mixed polyester of Example 4 are reacted at around 980°C with 339 parts of 1-isocyanato-3-isocyanato methyl-3,5,5-trimethyl cyclohexane and 446 parts of toluene to form an NCO-prepolymer with an NCO-content of 3.60% (based on solid substance).

Reaction with diamino cyclohexane in perchlorethylene/isopropanol as solvent 8.48 parts of diamino cyclohexane (36/64 cis/trans) are dissolved in a 1 : 1 mixture of perchlorethylene and isopropanol (570 parts) and the resulting solution stirred with 205 parts of the above prepolymer solution until the viscosity of the approximately 22% solution has risen to 340 poises. The excess terminal amino groups are removed by the addition of approximately 0.7 parts of butyl isocyanate.

Reaction in trichlorethylene/isopropanol as solvent 4.24 parts of diamino cyclohexane (34/64 cis/trans) are dissolved in 207 parts of trichlorethylene and 89 parts of isopropanol and the resulting solution stirred with 107.5 parts of the above NCO-prepolymer solution to form a homogeneous, clear solution with a viscosity of 293 poises: $c = 22\%$.

Clear, highly elastic films are obtained from the elastomer solutions, giving a soft tack-free feel after lamination on to cotton fabric. The coatings are extremely resistant to hydrolysis.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A polyurethane polyurea prepared by a process which comprises, reacting in an inert organic solvent a
   a. chain extender comprising at least 80 mol % 1,4-diamino cyclohexane with a cis/transisomer ratio of from 10/90 to 60/40, with
   b. an isocyanato terminated prepolymer prepared by a process which comprises reacting
      i. substantially linear polyhydroxyl compounds with molecular weights of from 500 to 5000, with
      ii. aliphatic or cycloaliphatic diisocyanates, the molar ratio of hydroxyl groups to isocyanate groups being between about 1 : 1.5 and 1 : 5,
   and evaporating the solvent.

2. The product of claim 1 wherein the solvent used is a mixture of an aromatic hydrocarbon, or chlorinated aliphatic hydrocarbon, with primary secondary or tertiary aliphatic alcohols.

3. A product according to claim 1 wherein the isocyanato terminated prepolymers are prepared from substantially linear polyhydroxyl compounds with molecular weights of from about 62 to 400.

4. The product of claim 1 wherein the prepolymers, diamines and chain extenders are reacted in a solvent mixture of chlorinated aromatic hydrocarbons.

5. The product of claim 1 wherein the polyhydroxyl compounds are dihydroxy polyesters, polycarbonates or polyacetones.

6. The product of claim 1 wherein the prepolymer includes diols with a tertiary amino group.

7. The product of claim 1 wherein the diisocyanate mixture contains at least 75 mol % of 1-isocyanato-3-isocyanato methyl-3,5,5-trimethyl cyclohexane.

8. The product of claim 1 wherein the molar ratio of isocyanate groups to amine groups in the chain extending reaction is between 1 : 1.0 and 1 : 1.15.

9. The product of claim 1 wherein polyhydroxyl compound has a molecular weight of from 800 to 3000 and a melting point below 45°C by the Kofler Bench method.

10. The product of claim 1 wherein the prepolymer includes a dihydroxy polyester selected from the group adipic acid-ethylene glycol, -1,6-hexane diol, -2,2-dimethyl propane diol, -1,4-butane diol or -1,2-propane diol.

* * * * *